United States Patent [19]
Reed et al.

[11] Patent Number: 6,014,893
[45] Date of Patent: Jan. 18, 2000

[54] TEST FIXTURE

[75] Inventors: David B. Reed; Mark Cooper, both of Detroit; Kenneth E. Rosink, Dryden; Henry J. Ziaja, Dearborn, all of Mich.

[73] Assignee: Chrysler Corporation, Auburn Hills, Mich.

[21] Appl. No.: 09/132,942

[22] Filed: Aug. 11, 1998

[51] Int. Cl.[7] .............................. G01N 3/04; G01N 17/00
[52] U.S. Cl. .............................................. 73/49.7; 73/865.6
[58] Field of Search .................................... 73/49.7, 49.8, 73/37, 46, 40.7, 865.6

[56] References Cited

U.S. PATENT DOCUMENTS

| | | |
|---|---|---|
| 2,345,387 | 3/1944 | Elsey . |
| 3,273,802 | 9/1966 | Hull, Jr. . |
| 3,357,235 | 12/1967 | Saito . |
| 3,813,923 | 6/1974 | Pendleton . |
| 3,926,036 | 12/1975 | Bower . |
| 3,958,448 | 5/1976 | Willis et al. . |
| 4,282,744 | 8/1981 | Dick . |
| 4,584,877 | 4/1986 | Brayman . |
| 4,719,801 | 1/1988 | Blaser et al. . |
| 4,779,468 | 10/1988 | Susuki . |
| 4,791,805 | 12/1988 | Gates . |
| 4,794,804 | 1/1989 | Ishii . |
| 4,799,390 | 1/1989 | Kimura . |
| 4,812,750 | 3/1989 | Keel et al. . |
| 4,813,268 | 3/1989 | Helvey . |
| 4,838,072 | 6/1989 | Vera . |
| 4,854,158 | 8/1989 | Gates . |
| 4,862,731 | 9/1989 | Gates . |
| 4,901,576 | 2/1990 | Rademacher . |
| 4,905,501 | 3/1990 | Sawatani . |
| 4,957,011 | 9/1990 | Huber et al. . |
| 5,361,626 | 11/1994 | Colligan et al. . |
| 5,375,456 | 12/1994 | Burns . |
| 5,503,032 | 4/1996 | Tikhtman et al. . |
| 5,646,358 | 7/1997 | Tikhtman et al. . |
| 5,665,903 | 9/1997 | Moran . |

Primary Examiner—Hezron Williams
Assistant Examiner—Jay L. Politzer
Attorney, Agent, or Firm—Lawrence J. Shurupoff

[57] ABSTRACT

A test fixture to test for possible leakage past a seal between adjacent portions of two test panels. The test panels are supported on a housing in edge-to-edge relation across the open front of a chamber in a housing. The panels are moved toward the open front of the chamber so that the panels seal against the open front. The housing is supported in a cabinet. Liquid is discharged into the cabinet and directed against the seal. The housing has a rear wall which is visible through the cabinet and is constructed to enable viewing into the chamber to see whether the seal has leaked.

8 Claims, 6 Drawing Sheets

TEST FIXTURE

This invention relates generally to test fixtures and more particularly to a fixture to test for leakage past a seal between test specimens.

Current procedure for water testing the weather seals of a motor vehicle requires placing an entire developmental vehicle in a water booth where the testing is carried out. The timing and availability of the developmental vehicle and the testing booth must be coordinated. The actual test procedure is both time consuming and labor intensive. What is needed is a simplified test fixture in which component parts or test specimens simulating component parts may be more easily and quickly tested for water tightness.

In accordance with the present invention, a test fixture is provided to test for leakage past a seal between adjacent edge portions of two test specimens or parts, wherein the parts are supported in edge-to-edge relationship in positions such that the seal contacts and bridges the adjacent edge portions. The parts are capable of being adjusted independently. Water or a suitable liquid is directed against the seal to determine whether the seal will prevent leakage. More specifically, the test parts are supported on a housing across the open front of the housing chamber in positions such that the parts close the chamber. The housing is supported in a transparent cabinet and the rear wall of the housing has an opening so that a person outside the cabinet can view the inside of the chamber and determine whether any water has leaked through the seal.

The test parts are independently supported on an arrangement of slides, enabling the parts to be moved horizontally and vertically toward and away from one another to test the limits of a seal's ability to seal between spaced apart separated parts. Each part is mounted on a first slide which may be adjusted by an independent actuator. These slides in the specific embodiment about to be described, are mounted for vertical sliding movement on horizontal slides. The horizontal slides are mounted on opposite sides of the housing and they too have independent actuators for effecting horizontal movement. The slides may be locked in adjusted positions during the test procedure.

One object of this invention is to provide a test fixture having the foregoing features and capabilities.

Another object is to provide a test fixture which is constructed of a relatively few simple parts, is rugged and durable in use, and enables the testing to be carried forward quickly and easily.

Other objects, features and advantages of the invention will become more apparent as the following description proceeds, especially when considered with the accompanying drawings.

DETAILED DESCRIPTION OF THE PREFERRED EMBODIMENT

Figure 1:
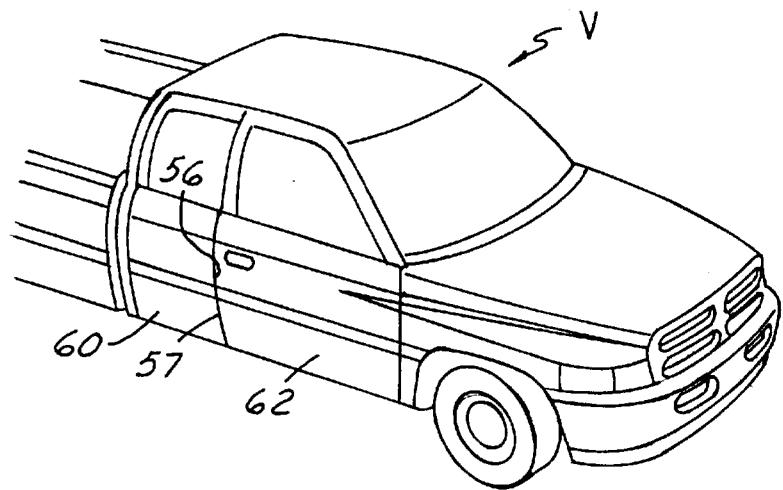
FIG. 1 is a fragmentary perspective view of the side of an automobile having doors which are simulated by test panels to be tested in the fixture of this invention.
Figure 2:
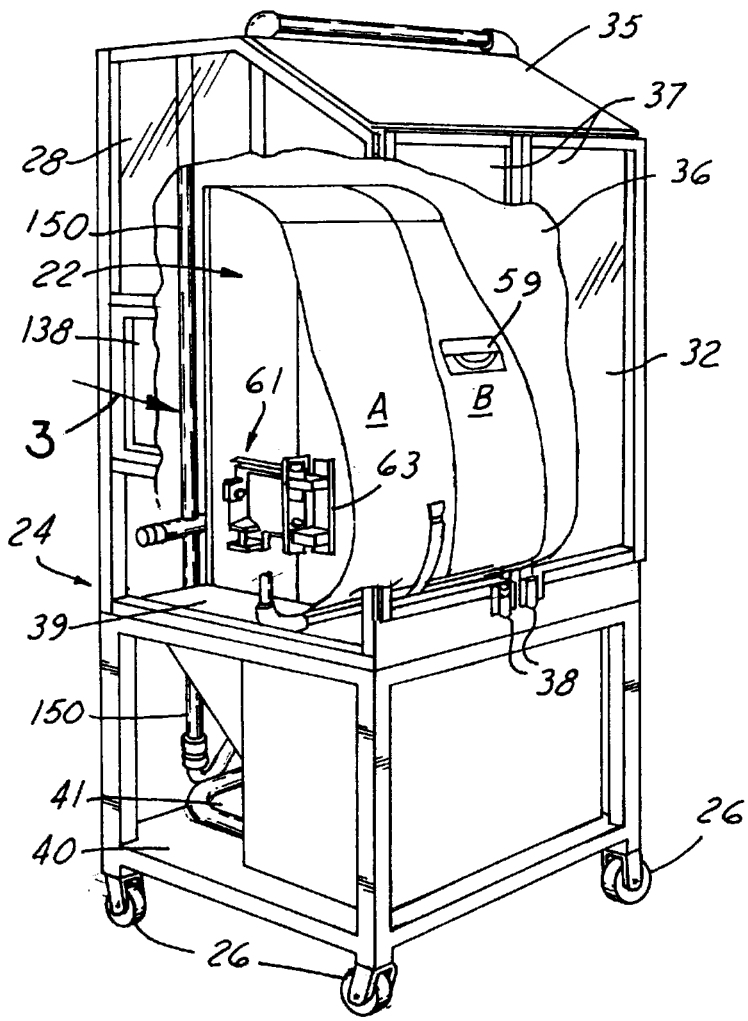
FIG. 2 is a front perspective view with parts broken away of a test fixture constructed in accordance with the invention.

Referring now more particularly to the drawings, the test fixture 20 of this invention comprises a housing 22 supported in a cabinet 24. The cabinet 24 is a basically rectangular structure supported on castors 26. The cabinet 24 has parallel, vertical, side walls 28 and 30, parallel, vertical, front and rear walls 32 and 34, and a top wall 35. The walls 28–35 preferably are made of a transparent material such as a suitable plastic and together form a compartment 36. The front wall 32 is made of two doors 37 which are hinged to the front edges of the side walls for swinging between open and closed positions. Releasable fasteners 38 secure the doors 37 in the closed position. When the doors are closed, the compartment 36 is completely sealed. The side and end walls of the cabinet surround a horizontal platform 39 supported above a shelf 40 on which a water pump 41 is mounted.

Figure 3:
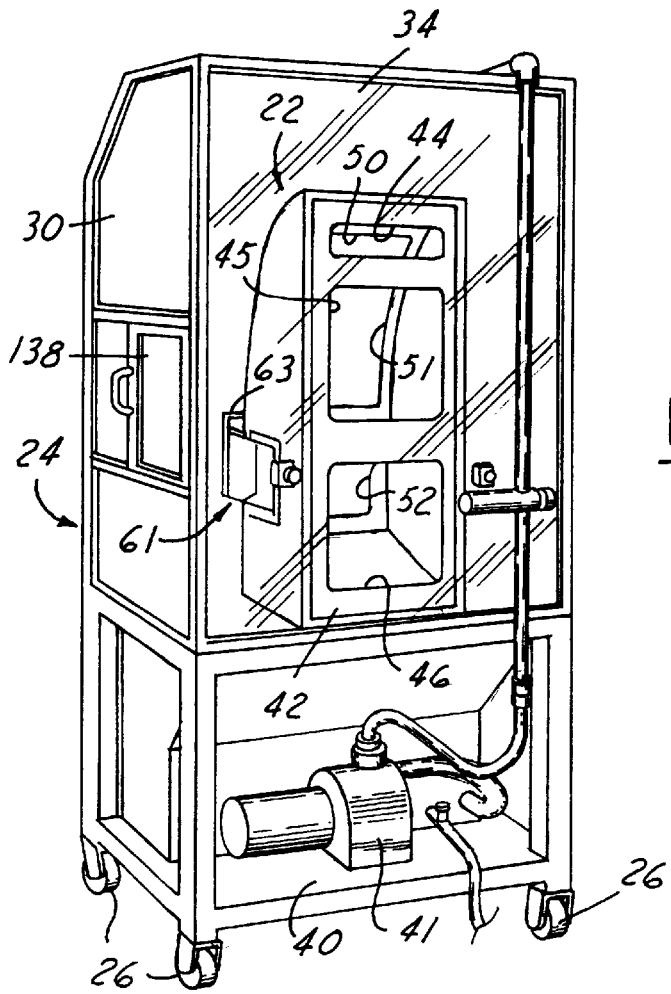
FIG. 3 is a rear perspective view of the test fixture.

The housing 22 is an upright, box-like structure supported on the platform 39 inside the compartment 36. The rear wall 42 of the housing is pressed flat against the rear wall 34 of the cabinet with a peripheral water tight seal 43 extending around the margin of the rear wall 42 in sealed engagement with the rear wall 34 of the cabinet. The rear wall 42 of the housing has openings 44, 45 and 46 (FIG. 3). A person can view the interior chamber 48 of the housing through the clear plastic of the rear wall 34 of the cabinet and through the openings 44, 45 and 46.

Figure 4:
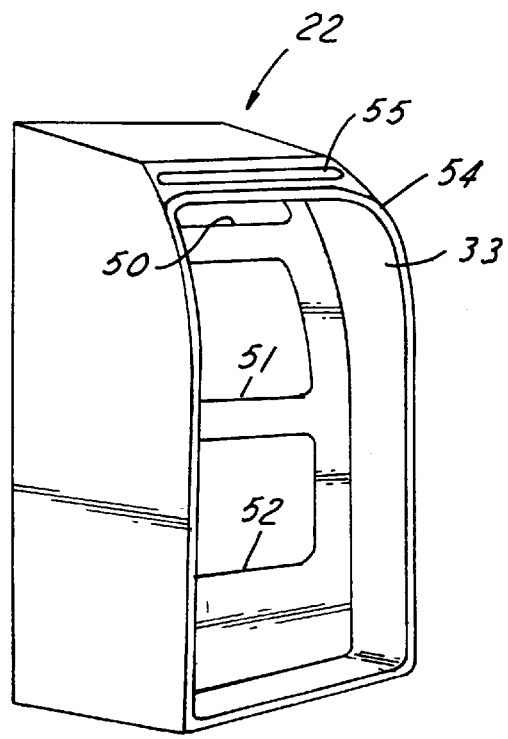
FIG. 4 is a front perspective view of the housing within the cabinet of the test fixture, with parts for supporting the test panels removed for clarity.

The rear wall 42 of the housing 22 has openings 50, 51 and 52 which are generally aligned with the openings 44, 45 and 46 in the rear wall 34. The open front of the housing 22 is surrounded by a forwardly projecting frame 53 (FIG. 4) having a continuous annular, peripheral sealing strip 54. A secondary sealing strip 55 extends across the top of the frame 53 above the sealing strip 54. The open front of the frame 53 is contoured as best seen in FIG. 4 to correspond to the general contour of the test specimens or panels A and B.

The test panels A and B may be actual vehicle doors or they may be simulations of actual vehicle doors, either full size or made on a reduced scale. The test panels A and B will sometimes hereinafter be referred to as "panels" or "doors" or "door panels" and simulate actual vehicle doors of the type that are mounted on one side of a motor vehicle in edge-to-edge relation such that the adjacent edges 56 and 57 are close together and similarly contoured. The adjacent edges of the panels A and B are also identified by the numerals 56 and 57. An elongated seal 58 contacts the adjacent edge portions of panels A and B. The seal 58 is bonded to the door panel A along one edge 56 and makes sealing contact with an adjacent edge portion of the other door panel B when the panels are in the generally co-planar closed position for water tightness testing as in FIG. 6. The panels A and B can be latched together in the FIG. 6 position by a latch operated by a handle 59 on panel B. The seal 58 is an elongated strip of rubber or the like and at its ends makes contact with the sealing strip 54 along the top and bottom of the frame 53 when the panels A and B are in the FIG. 6 position.

FIG. 1 shows doors 60 and 62 on one side of a vehicle V. The door panels A and B simulate only the inner or adjacent portions of the doors 60 and 62.

The door panels A and B are supported by support and adjusting mechanism 61. Thus, panels A and B have mounting plates 63 secured to the laterally outer edge portions thereof. The plates 63 are pivoted to vertical slides 64 and 65 by hinges 66. More specifically, each hinge has hinge knuckles 67 on the plate 63 and hinge knuckles 68 on a plate 69 which is secured to one of the vertical slides 64, 65. A hinge pin 70 pivotally connects the hinge knuckles. Each of the vertical slides 64, 65 is mounted for vertical sliding movement between vertical L-shaped guide bars 78 and 79 mounted on the associated one of the horizontal slides 80 and 82. The horizontal slides are mounted for horizontal sliding movement between guide bars 84 and 86. One set of guide bars 84 and 86 are mounted on one side of the housing 22 for guiding the slide 80. Another set of guide bars 84 and 86 are mounted on the other side of the housing 22 for guiding the slide 82.

A locking screw 90 is threaded into each of the horizontal slides 80, 82 and extends outwardly through a vertically elongated slot 92 in the associated one of the vertical slides 64, 65. A tube 94 is sleeved on each of the screws between the head 96 of the screw and the associated vertical slide. When the screw is tightened, the tube 94 is compressed against the vertical slide and the vertical slide is thereby locked to the horizontal slide against vertical movement.

A locking screw 100 is threaded into each side of the housing and extends outwardly through an elongated horizontal slot 102 in the associated one of the horizontal slides 80, 82. A tube 104 is sleeved on each of the screws 100 between the head 106 of the screw and the associated horizontal slide. When the screw 100 is tightened, the tube 104 is compressed against the horizontal slide and the horizontal slide is thereby locked to the housing against horizontal movement.

A gauge strip 110 is secured to an edge of each of the vertical slides 64, 65 adjacent to one of the L-shaped guide bars 78, 79. That guide bar also has a gauge strip 112 alongside the guide strip 110 to provide an indication of the vertical position of the vertical slide.

A gauge strip 120 is secured to an edge of each of the horizontal slides 80, 82 adjacent to one of the guide bars 84, 86. That guide bar also has a gauge strip 122 alongside the gauge strip 120 to provide an indication of the horizontal position of the horizontal slide.

A vertical adjusting screw 130 is provided for each vertical slide 64, 65. The screw 130 threads through a block 132 on the housing 22 and rotates in a hole in a block 134 on the vertical slide, with the block 134 captured between abutments 136 on the screw so that the vertical slide may be raised or lowered by rotation of the screw 130. The screw 130 is rotated by a handle 137 inside the cabinet. The side walls 28 and 30 of the cabinet have hinged doors 138 to provide access to the handles 137.

A horizontal adjusting screw 140 is provided for each horizontal slide 80, 82. The screw 140 extends through the rear wall 34 of the cabinet and threads through a block 142 on the rear wall 34 of the cabinet. Screw 140 rotates in a hole in a block 144 on the horizontal slide, with the block 144 captured between abutments 146 on the screw so that the horizontal slide may be adjusted horizontally by rotation of the screw 140. The screw 140 is rotated by an handle 147 outside the cabinet.

The water pump 41 pumps water through the pipes 150 which lead into the compartment 36 within the cabinet to a plurality of hoses 154 each provided with a nozzle 156.

Figure 5:
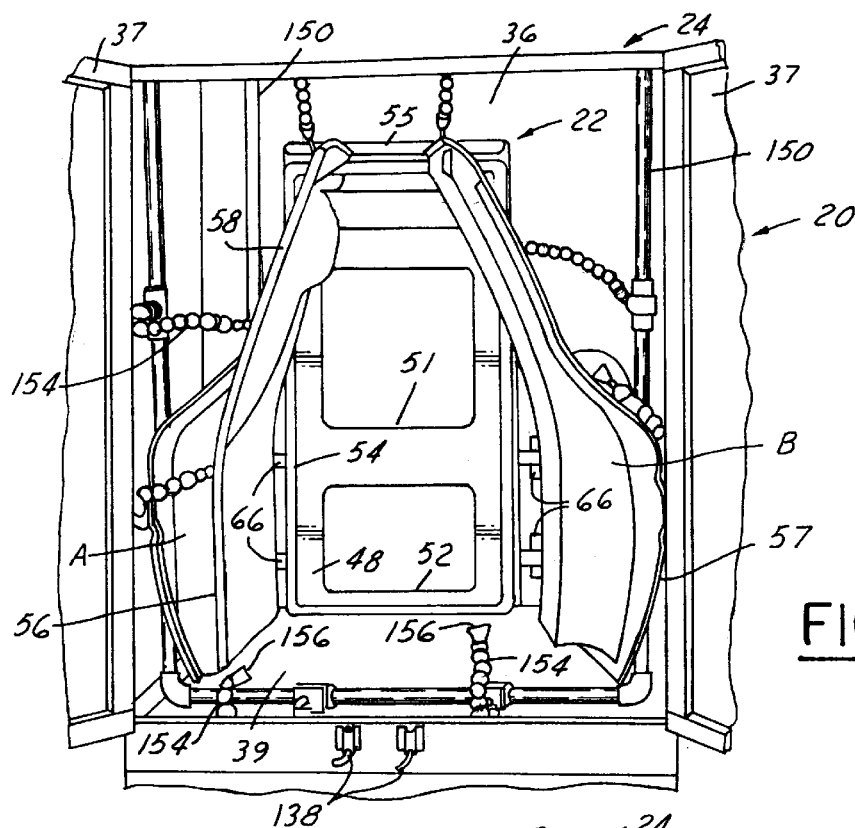
FIG. 5 is a fragmentary front view showing the cabinet doors open and showing the test panels mounted in open position on a housing within the cabinet.
Figure 6:
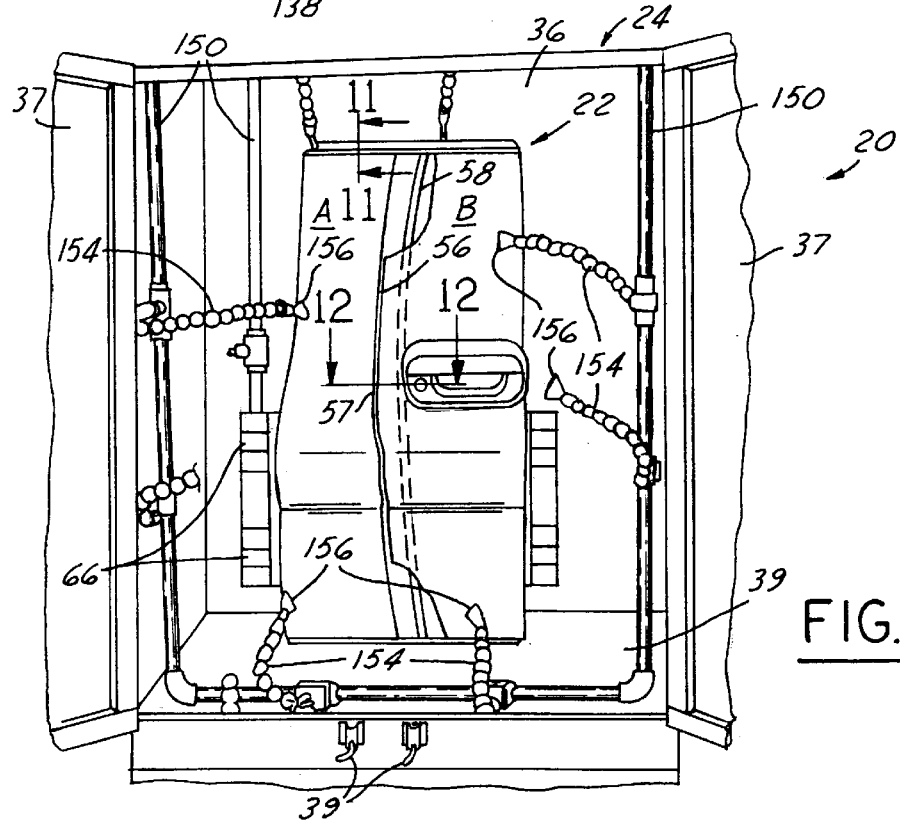
FIG. 6 is similar to FIG. 5 but shows the test panels in the closed position for testing.
Figure 7:
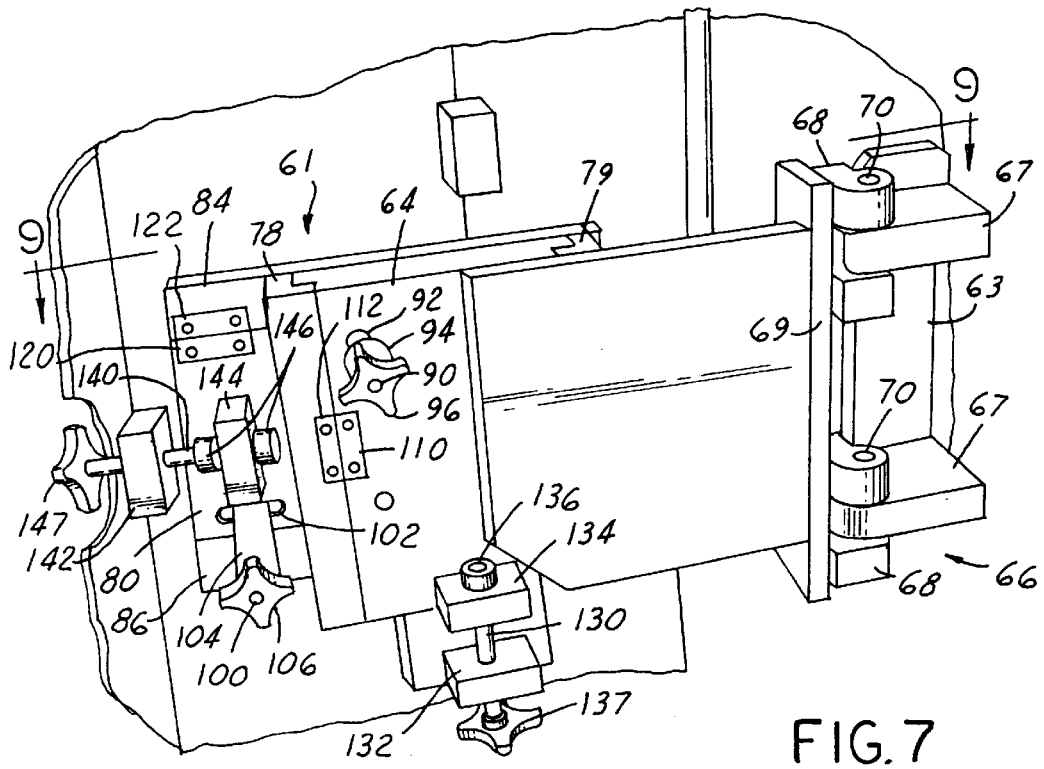
FIG. 7 is a fragmentary perspective view showing the arrangement for moving one of the test panels, mounted on one side of the housing.
Figure 8:
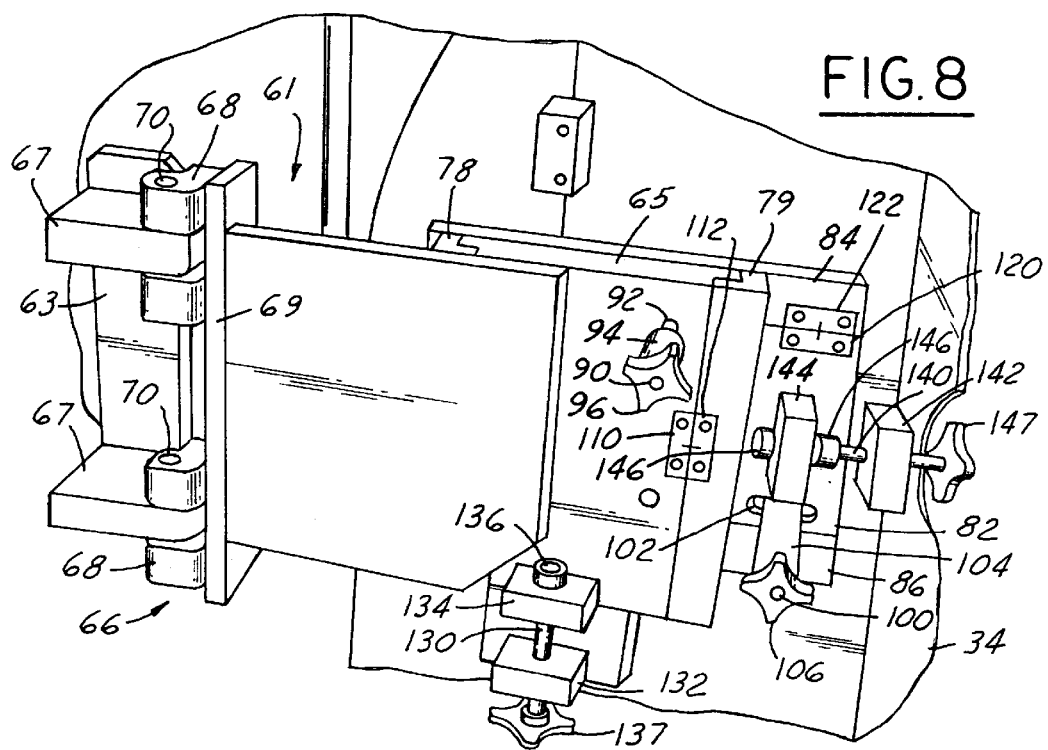
FIG. 8 is fragmentary perspective view showing the arrangement for moving the other test panel, mounted on the other side of the housing.
Figure 9:
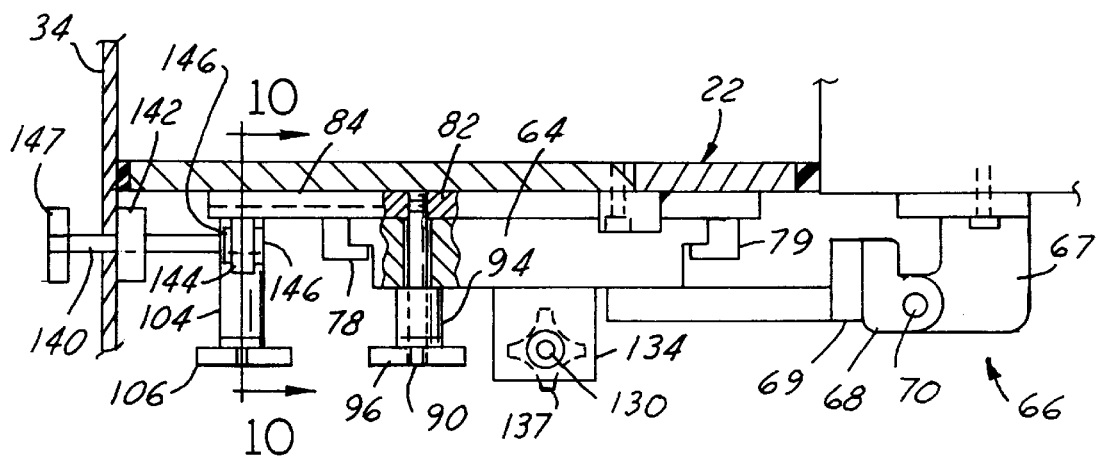
FIG. 9 is a sectional view taken on the line 9—9 in FIG. 7.
Figure 10:
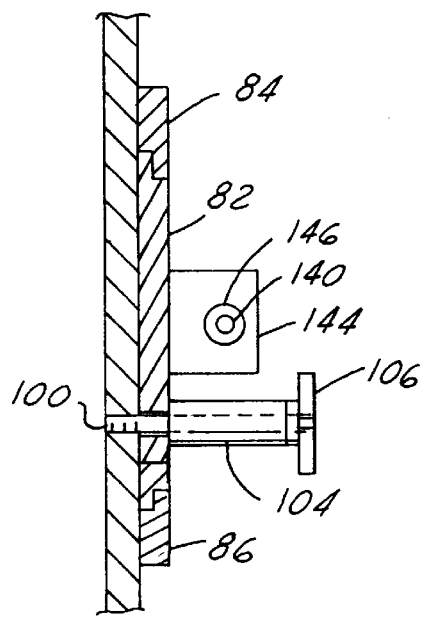
FIG. 10 is a sectional view taken on the line 10—10 in FIG. 9.
Figure 11:
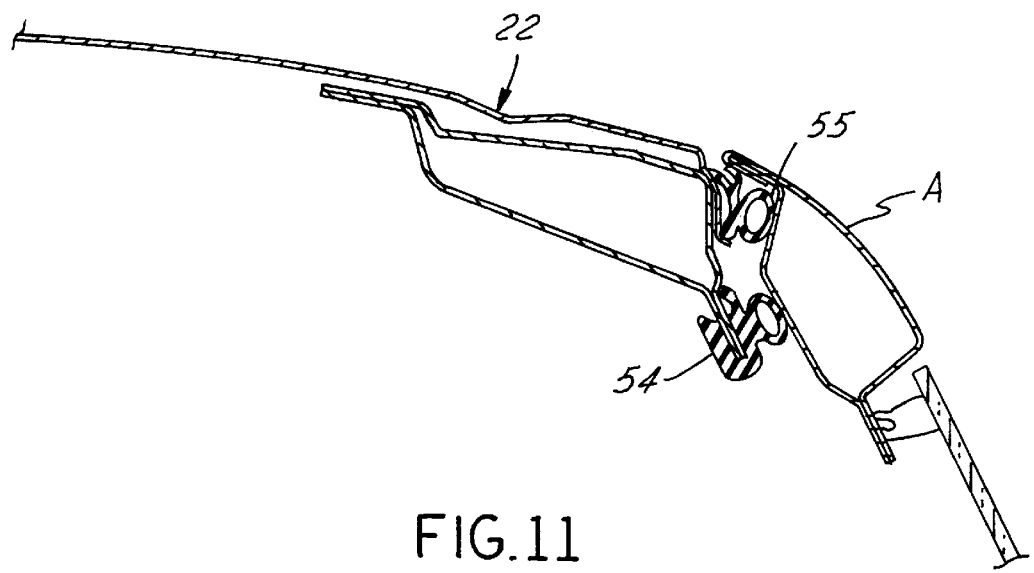
FIG. 11 is a fragmentary sectional view taken on the line 11—11 in FIG. 6.
Figure 12:
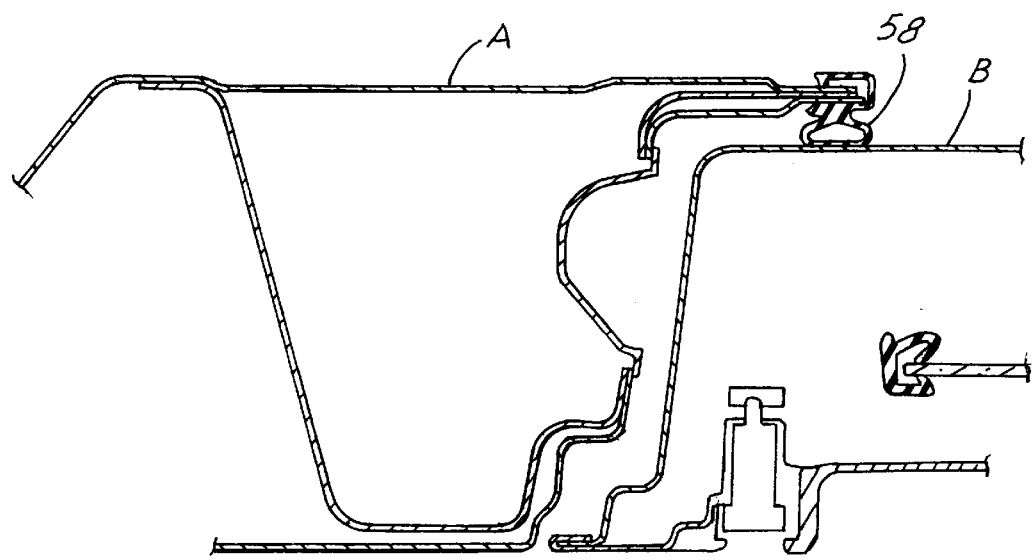
FIG. 12 is a fragmentary sectional view taken on the line 12—12 in FIG. 6.

In use of the test fixture, the doors 37 of the cabinet are swung open as in FIGS. 5 and 6, enabling the test panels A and B to be attached to the vertical slides 64 and 65 on housing 22. This is accomplished by aligning the hinge knuckles of each of the hinges 66 and inserting the associated hinge pin 70. The test panels A and B are swung from the FIG. 5 position to the generally co-planar FIG. 6 position in which their adjacent edges 56 and 57 come very close together and the sealing strip 58 on panel A makes sealing contact with panel B along its full length. The panels A and B are latched in this position by operation of handle 59. The vertical slides 64, 65 are moved up or down as required to properly align the upper and lower edge portions of the test panels with the upper and lower portions of the sealing strips 54 and 55. The horizontal slides 80, 82 are moved rearwardly to bring the marginal edge portions of the test panels into a proper sealed relationship with the sealing strip 54. The panels A and B are thus completely peripherally sealed by sealing strip 54 throughout the full extent of strip 54 and are also sealed across the top by strip 55. The chamber 48 within the housing 22 is also sealed by the panels A and B at the front and the seal 43 around the rear of the housing. The movement of the vertical and horizontal slides is accomplished by the adjusting screws 130 and 140. The slides may then be locked in their adjusted positions by the locking screws 90 and 100 which can be reached through the hinged doors 138.

When the test panels A and B are latched together and properly positioned in sealed relation to the sealing strips 54 and 55, the strip 58 on panel A makes sealing contact with panel B, along its full length, and with the sealing strip 54 at its ends. The pump is operated to spray liquid, usually water, onto the front of the test panels and particularly along the adjacent edges thereof 56 and 57. Any leakage through the seal 58 can be seen by looking into the chamber 48 within the housing 22 through the rear wall 34 of the cabinet as in FIG. 3.

The test panels A and B can be separated from one another by measured amounts as indicated on gauge strips 110 and 120. By separating the panels both horizontally and vertically until a leak occurs, the limits of the sealing strip 54 can be tested. This can prove useful in designing the sealing strip to accommodate manufacturing tolerances between panels A and B which arise during vehicle assembly.

What is claimed is:

1. A test fixture to test for possible leakage past an elongated seal between adjacent portions of first and second test panels, comprising, a housing forming a chamber having an open front defined by annular sealing means, support means for supporting the panels on the housing in substantially co-planar edge-to-edge relation across the open front of the chamber with the seal contacting both of the panels, means for moving said support means toward the open front of the chamber to cause the panels to seal against the sealing means defining said open front, and liquid supply means for directing liquid against the seal to determine whether the seal will prevent leakage.

2. A test fixture according to claim 1, further including a cabinet defining a closed space within which said housing is disposed, and the liquid supply means has means for discharging liquid into the closed space.

3. A test fixture according to claim 2, wherein said support means comprises a first slide for the first panel and a second slide for the second panel, and the means for moving said support means comprises a first actuator for the first slide and a second actuator for the second slide.

4. A test fixture according to claim 3, wherein said actuators are independently actuable.

5. A test fixture according to claim 4, wherein said first slide is slidably mounted on a third slide, said second slide is slidably mounted on a fourth slide, means mounting said third slide for sliding movement along a path perpendicular to the path of said first slide, and means mounting said fourth slide for sliding movement along a path perpendicular to the path of said second slide and parallel the path of said third slide.

6. A test fixture according to claim 5, further including means for locking said slides in adjusted positions.

7. A test fixture according to claim 6, wherein the housing has a rear wall visible through said cabinet and constructed to enable viewing into the chamber to visually determine whether the seal has leaked.

8. A test fixture according to claim 7, wherein the housing has a rear wall sealed against a rear wall of the cabinet, the rear wall of the cabinet bing made of transparent material, and said rear wall of the housing having an opening therein for viewing into said chamber.

* * * * *